(12) United States Patent
Huang

(10) Patent No.: US 8,162,268 B1
(45) Date of Patent: Apr. 24, 2012

(54) MONITOR SUPPORT DEVICE

(76) Inventor: Ming-Hsien Huang, Taipei Hsien (TW)

( * ) Notice: Subject to any disclaimer, the term of this patent is extended or adjusted under 35 U.S.C. 154(b) by 0 days.

(21) Appl. No.: 13/273,496

(22) Filed: Oct. 14, 2011

Related U.S. Application Data

(63) Continuation of application No. 29/381,032, filed on Dec. 14, 2010, now Pat. No. Des. 649,552, which is a continuation of application No. 12/236,898, filed on Sep. 24, 2008, now abandoned.

(30) Foreign Application Priority Data

Nov. 22, 2007 (TW) .............................. 96219749 U

(51) Int. Cl.
*A47F 5/00* (2006.01)

(52) U.S. Cl. .................... 248/124.1; 248/125.7; 248/920

(58) Field of Classification Search .................. 359/855, 359/865; 248/474, 124.1, 125.1, 125.7, 917, 248/918, 920
See application file for complete search history.

(56) References Cited

U.S. PATENT DOCUMENTS

| | | |
|---|---|---|
| 839,339 A | 12/1906 | Tuttle |
| 1,190,050 A | 7/1916 | Verba |
| 2,764,913 A | 10/1956 | Green |
| 3,709,585 A | 1/1973 | Tsai |
| 4,208,104 A | 6/1980 | Peterson |
| 4,830,326 A | 5/1989 | Schmidt |
| 4,890,909 A | 1/1990 | Schmidt et al. |
| 5,128,838 A | 7/1992 | Brandess |
| 5,438,457 A | 8/1995 | Moore |
| 5,681,017 A | 10/1997 | Clausen |
| 5,918,841 A | 7/1999 | Sweere et al. |
| 6,554,238 B1 | 4/2003 | Hibberd |
| D476,333 S | 6/2003 | Lee |
| D476,509 S | 7/2003 | Orsino et al. |
| 6,598,839 B2 | 7/2003 | Loughman |
| D491,952 S | 6/2004 | Oddsen et al. |
| 6,863,252 B2 | 3/2005 | Bosson |
| 7,207,532 B1 | 4/2007 | Roberts et al. |
| 7,246,780 B2 | 7/2007 | Oddsen, Jr. |
| 7,331,551 B2 | 2/2008 | Oddsen, Jr. |
| 7,529,083 B2 | 5/2009 | Jeong |
| 7,621,500 B2 | 11/2009 | Ishizaki et al. |
| 7,639,481 B2 | 12/2009 | Katsumata et al. |
| 7,733,645 B2 | 6/2010 | Hsu |
| D621,842 S | 8/2010 | Sapper |
| 2002/0066837 A1 | 6/2002 | Dunbar |
| 2006/0238967 A1 | 10/2006 | Carson et al. |
| 2007/0205340 A1 | 9/2007 | Jung |
| 2008/0055832 A1 | 3/2008 | Ozolins et al. |
| 2008/0117578 A1 | 5/2008 | Moscovitch |
| 2008/0225472 A1 | 9/2008 | Chih |
| 2008/0232044 A1 | 9/2008 | Moscovitch |
| 2009/0134285 A1 | 5/2009 | Huang |
| 2010/0128423 A1 | 5/2010 | Moscovitch |

*Primary Examiner* — Bradley Duckworth

(74) *Attorney, Agent, or Firm* — Frommer Lawrence & Haug LLP; Ronald R. Santucci

(57) ABSTRACT

A monitor support device includes a base, an upright rod that projects upwardly from the base, a first support arm that is pivotable about and movable along the upright rod and that is adapted for supporting a monitor thereon, and a second support arm that is pivotable about the upright rod, that is movable relative to the first support arm along the upright rod, and that is adapted for supporting another monitor thereon.

5 Claims, 8 Drawing Sheets

MONITOR SUPPORT DEVICE

This application is a continuation of U.S. application Ser. No. 29/381,032, filed Dec. 14, 2010, which is a continuation of U.S. application Ser. No. 12/236,898, filed Sep. 24, 2008, and claims priority to Taiwanese Application No. 096219749, filed on Nov. 22, 2007, the entirety of which are incorporated herein by reference.

BACKGROUND OF THE INVENTION

1. Field of the Invention

The invention relates to a monitor support device, more particularly to a monitor support device that can support a plurality of monitors thereon.

2. Description of the Related Art

Operating system software generally has a function of supporting multiple monitors. When using the operating system software with multiple monitors, these monitors are placed adjacent to each other in front of a user. However, if the user changes his position and each of these monitors is supported individually on a monitor stand, the user has to adjust the positions or orientations of the monitors separately, which is time-consuming and inconvenient.

As shown in FIGS. 1 and 2, a conventional monitor support device 9 includes a base 91, an upright rod 92 projecting upwardly from the base 91, a support arm 93 pivotable about the upright rod 92, and a pair of monitor engaging members 94. The support arm 93 is formed with a pair of horizontal slots 931 at opposite parts thereof with respect to the upright rod 92. Each of the monitor engaging members 94 engages slidably a respective one of the horizontal slots 931, and has a sliding part 941 extending slidably through the respective one of the horizontal slots 931, and a rotatable part 942 connected to and rotatable relative to the sliding part 941 and adapted for mounting a monitor 8 thereon. In use, the user can adjust the positions and orientations of the monitors 8 simultaneously by rotating the support arm 93 about the upright rod 92. Moreover, the user can rotate the rotatable part 942 of one of the monitor engaging members 94 to adjust the orientation of the monitor 8 mounted thereon relative to that of the monitor 8 mounted on the other one of the monitor engaging members 94.

SUMMARY OF THE INVENTION

The present invention can provide a monitor support device that is capable of supporting a plurality of monitors thereon, and that permits adjustment of positions and orientations of the monitors.

Accordingly, a monitor support device of the present invention comprises a base, an upright rod that projects upwardly from the base, a first support arm that is pivotable about and movable along the upright rod and that is adapted for supporting a monitor thereon, and a second support arm that is pivotable about the upright rod, that is movable relative to the first support arm along the upright rod, and that is adapted for supporting another monitor thereon.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION

Figure 1:
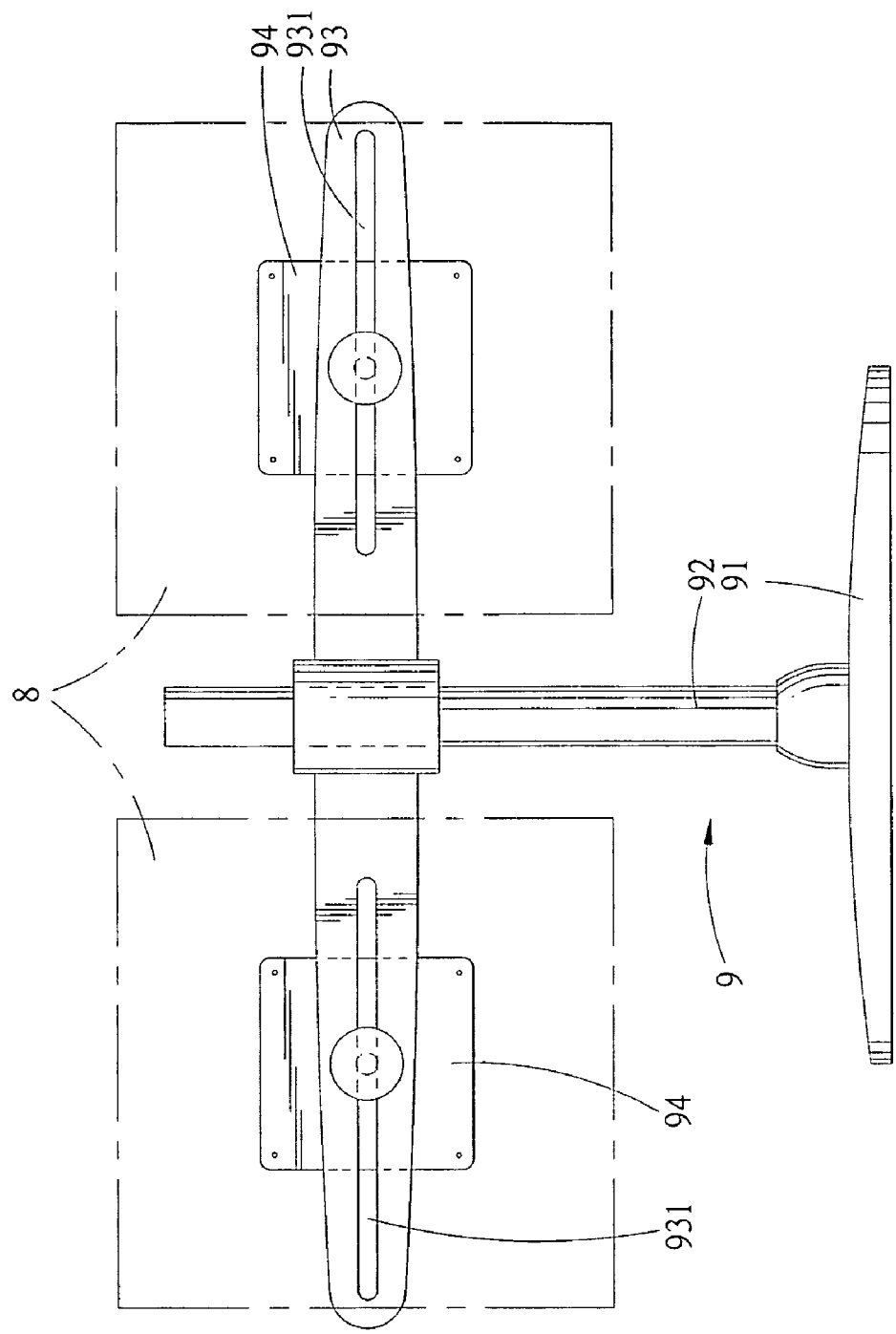
FIG. 1 is a rear view of a conventional monitor support device.

Before the present invention is described in greater detail, it should be noted that like elements are denoted by the same reference numerals throughout the disclosure.

As shown in FIGS. 3, 4, 5, and 7, the first preferred embodiment of a monitor support device according to the present invention comprises a base 1, an upright rod 2 that projects upwardly from the base 1, a first support arm 3 that is pivotable about and movable along the upright rod 2 and that is adapted for supporting a monitor 11 thereon, and a second support arm 4 that is pivotable about the upright rod 2, that is movable relative to the first support arm 3 along the upright rod 2, and that is adapted for supporting another monitor 11 thereon.

The first support arm 3 has a first pivot portion 31 formed at one end thereof and connected pivotally and movably to the upright rod 2, and a first extending portion 32 extending horizontally from the first pivot portion 31. In this embodiment, the first pivot portion 31 has a first surrounding wall 311 made of a flexible material and surrounding the upright rod 2. The first surrounding wall 311 has a first initial section 313 connected to the first extending portion 32, a first end section 314 spaced slightly apart from the first initial section 313, and a first intermediate section 315 interconnecting the first initial section 313 and the first end section 314 and defining a first rod hole 312 through which the upright rod 2 extends.

The second support arm 4 has a second pivot portion 41 formed at one end thereof and connected pivotally and movably to the upright rod 2, and a second extending portion 42 extending horizontally from the second pivot portion 41. In this embodiment, the second pivot portion 41 has a second surrounding wall 411 made of a flexible material and surrounding the upright rod 2. The second surrounding wall 411 has a second initial section 413 connected to the second extending portion 42, a second end section 414 spaced slightly apart from the second initial section 413, and a second intermediate section 415 interconnecting the second initial section 413 and the second end section 414 and defining a second rod hole 412 through which the upright rod 2 extends.

The first pivot portion 31 of the first support arm 3 is provided with a first locking component 61 extending through the first initial section 313 and the first end section 314 of the first surrounding wall 311, and movable between an unlocking position (not shown), where the first surrounding wall 311 is permitted to move along the upright rod 2, and a locking position (see FIGS. 5 and 6), where the first locking component 61 draws the first end section 314 toward the first initial section 313 so as to constrict the first rod hole 312, such that the first surrounding wall 311 is secured on the upright rod 2 due to friction between the first surrounding wall 311 and the upright rod 2.

The second pivot portion 41 of the second support arm 4 is provided with a second locking component 62 extending through the second initial section 413 and the second end section 414 of the second surrounding wall 411, and movable between an unlocking position (not shown), where the second surrounding wall 411 is permitted to move along the upright rod 2, and a locking position (see FIGS. 5 and 6), where the second locking component 62 draws the second end section 414 toward the second initial section 413 so as to constrict the second rod hole 412, such that the second surrounding wall 411 is secured on the upright rod 2 due to friction between the second surrounding wall 411 and the upright rod 2. In this embodiment, each of the first and second locking components 61, 62 is a screw, but may be other types of fasteners that can constrict the first and second rod holes 312, 412 in other embodiments of this invention.

In this embodiment, the first surrounding wall 311 of the first pivot portion 31 of the first support arm 3 has a bottom surface 316, and the second surrounding wall 411 of the second pivot portion 41 of the second support arm 4 is disposed below the first surrounding wall 311 and has a top surface 416 that confronts the bottom surface 316. The bottom surface 316 of the first surrounding wall 311 is formed with a first engaging block 34 protruding therefrom. The top surface 416 of the second surrounding wall 411 is formed with a second engaging block 44 protruding therefrom. The bottom surface 316 is further formed with a first engaging groove 33 angularly spaced apart from the first engaging block 34 and having an arc length longer than that of the second engaging block 44. The top surface 416 is further formed with a second engaging groove 43 angularly spaced apart from the second engaging block 44 and having an arc length longer than that of the first engaging block 34. Therefore, when the first pivot portion 31 of the first support arm 3 and the second pivot portion 41 of the second support arm 4 are moved along the upright rod 2 to be coupled together, the first engaging groove 33 receives slidably the second engaging block 44 therein, while the second engaging groove 43 receives slidably the first engaging block 34 therein, such that an angle formed between the first and second support arms 3, 4 is limited, thereby avoiding damage to the monitors 11 that are mounted thereon by preventing collision between the monitors 11 when the first and second support arms 3, 4 are pivoted about the upright rod 2.

The monitor support device of the first preferred embodiment further comprises a pair of collars 7 made of a material that is softer than those of the upright rod 2 and the first and the second surrounding walls 311, 411. One of the collars 7 is disposed between the first surrounding wall 311 of the first pivot portion 31 of the first support arm 3 and the upright rod 2 for enhancing friction between the first surrounding wall 311 and the upright rod 2 when the first locking component 61 is at the locking position. The other one of the collars 7 is disposed between the second surrounding wall 411 of the second pivot portion 41 of the second support arm 4 and the upright rod 2 for enhancing friction between the second surrounding wall 411 and the upright rod 2 when the second locking component 62 is at the locking position.

Figure 3:
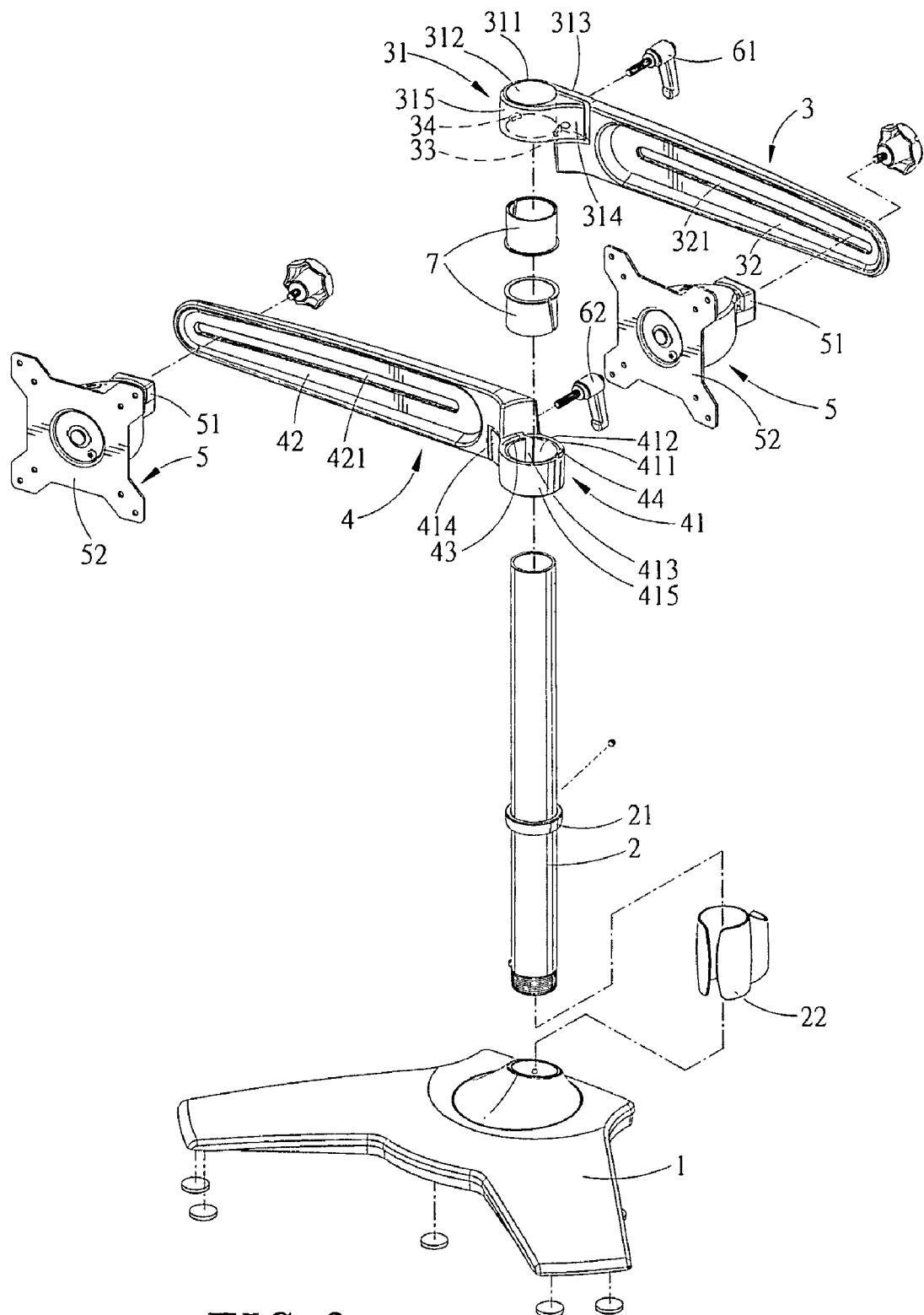
FIG. 3 is an exploded perspective view of a first preferred embodiment of a monitor support device according to the invention.
Figure 4:
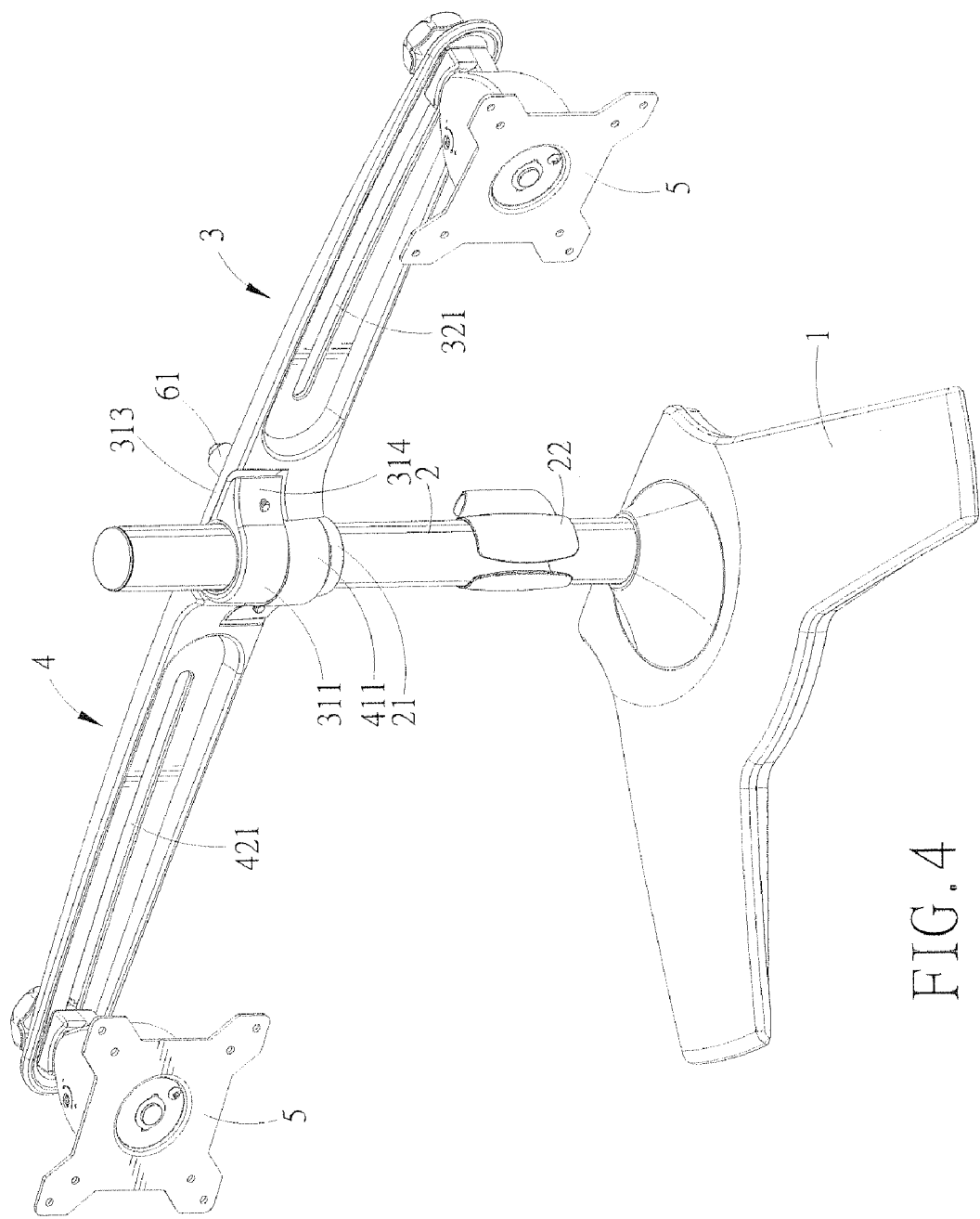
FIG. 4 is an assembled perspective view of the first preferred embodiment.
Figure 5:
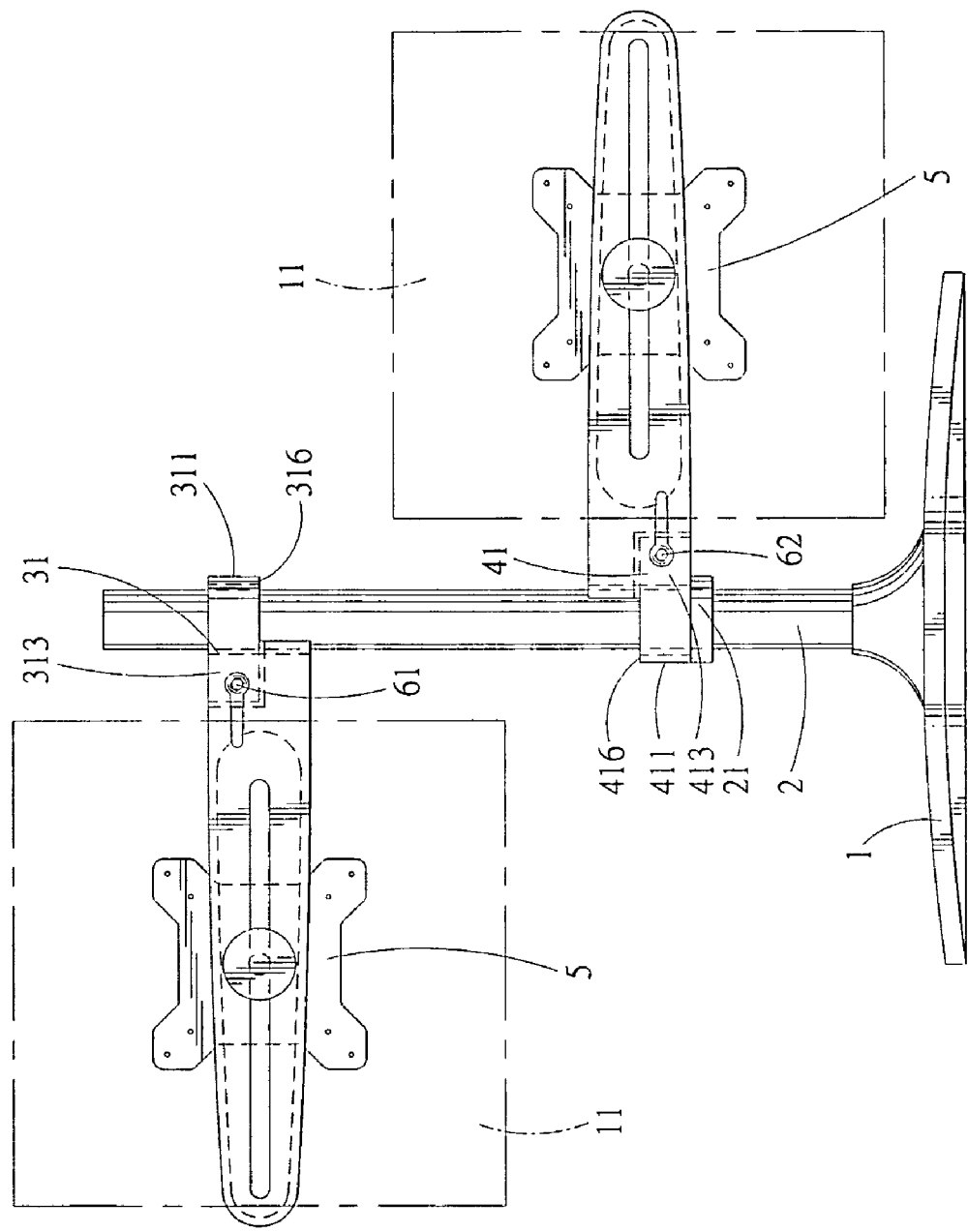
FIG. 5 is a front view of the first preferred embodiment.
Figure 6:
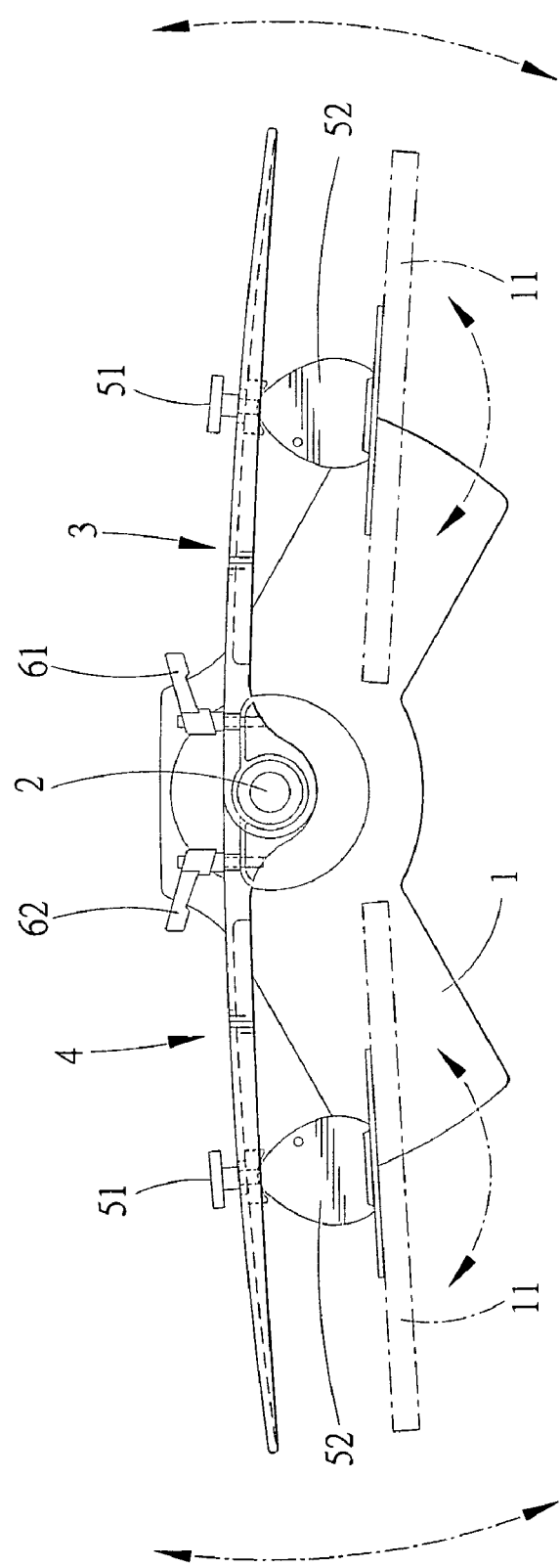
FIG. 6 is a top view of the first preferred embodiment.
Figure 7:
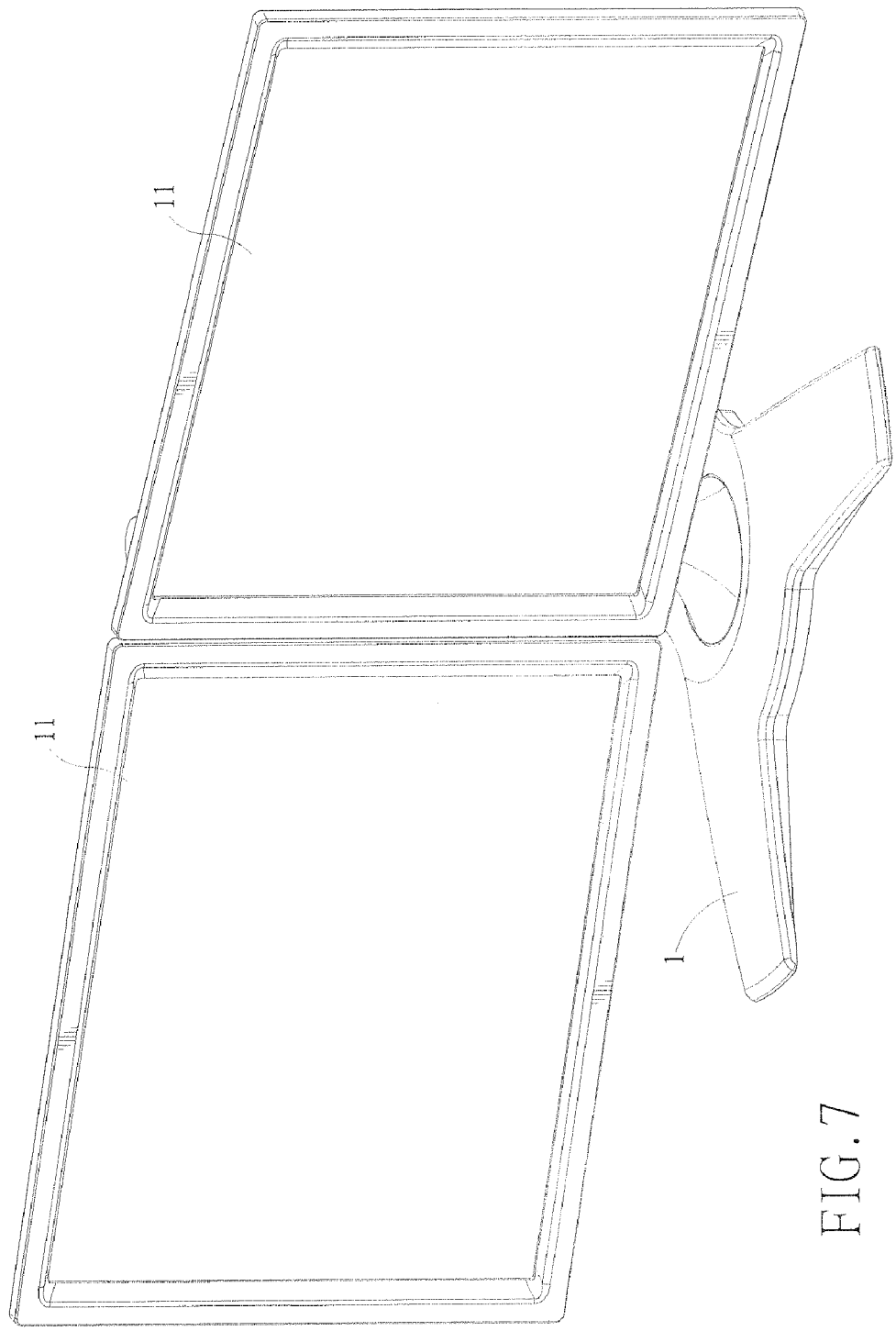
FIG. 7 is a perspective view of the first preferred embodiment when supporting a pair of monitors thereon.

Referring to FIGS. 3, 4 and 6, the first extending portion 32 of the first support arm 3 is formed with a first elongated slot 321 that extends horizontally, and the second extending portion 42 of the second support arm 4 is formed with a second elongated slot 421 that extends horizontally. The monitor support device of the first preferred embodiment further comprises a pair of monitor engaging components 5, each of which engages slidably a respective one of the first and second elongated slots 321, 421. In this embodiment, each of the monitor engaging components 5 has a sliding part 51 extending slidably through the respective one of the first and second elongated slots 321, 421, and a rotatable part 52 connected to and rotatable relative to the sliding part 51 and adapted for mounting the monitor 11 thereon.

In this embodiment, the monitor support device further comprises a limiting component 21 sleeved securely on the upright rod 2 under the first surrounding wall 311 of the first pivot portion 31 of the first support arm 3. The limiting component 21 has a diameter larger than that of each of the first rod hole 312 in the first support arm 3 and the second rod hole 412 in the second support arm 4 so as to limit the lowermost positions of the first and second support arms 3, 4 along the upright rod 2.

The monitor support device of the first preferred embodiment further comprises a cable organizing member 22 coupled detachably on the upright rod 2 under the limiting component 21.

Figure 2:
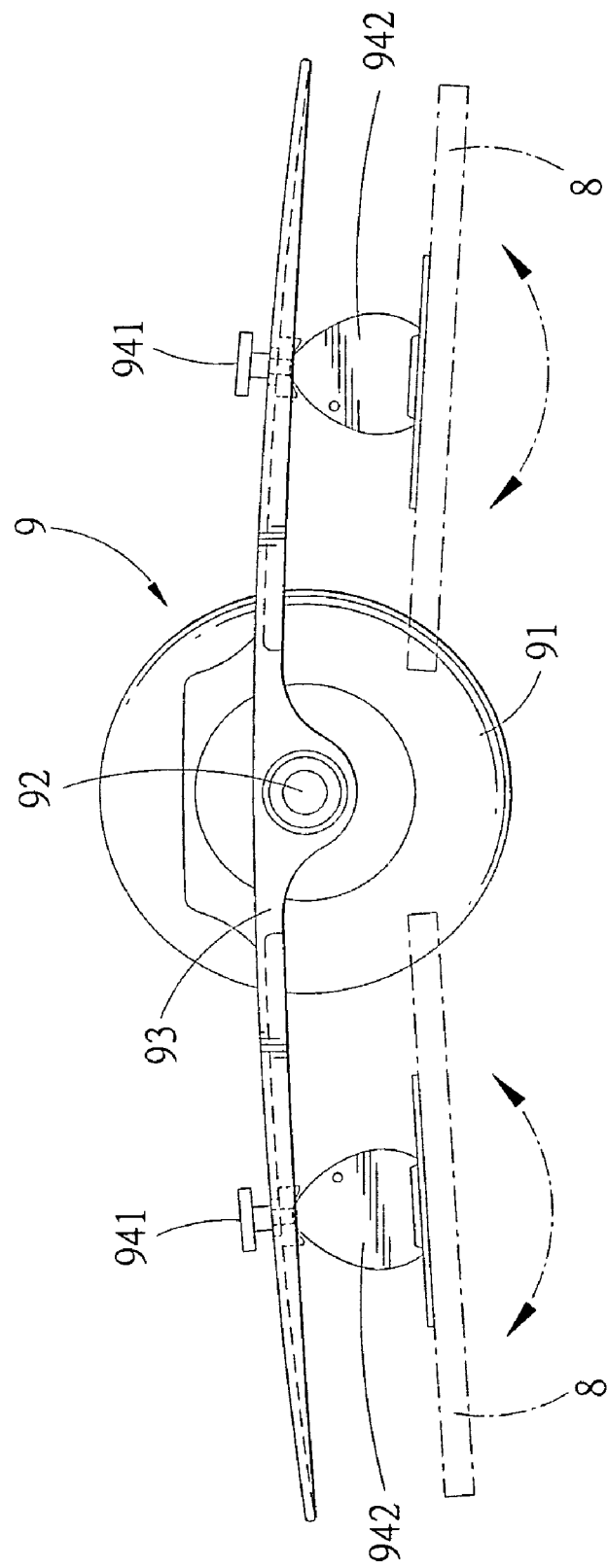
FIG. 2 is a top view of the conventional monitor support device.

Compared to the conventional monitor support device 9 illustrated in FIGS. 1 and 2, the first and second support arms 3, 4 can be moved separately along the upright rod 2, so that the monitors 11 mounted thereon can be secured at different heights relative to the base 1. Moreover, the orientations of the monitors 11 can be individually adjusted through pivoting movements of the first and second support arms 3, 4 and rotary movements of the rotatable parts 52 of the monitor engaging components 5. Therefore, the monitor support device of this embodiment offers greater flexibility during use.

Figure 8:
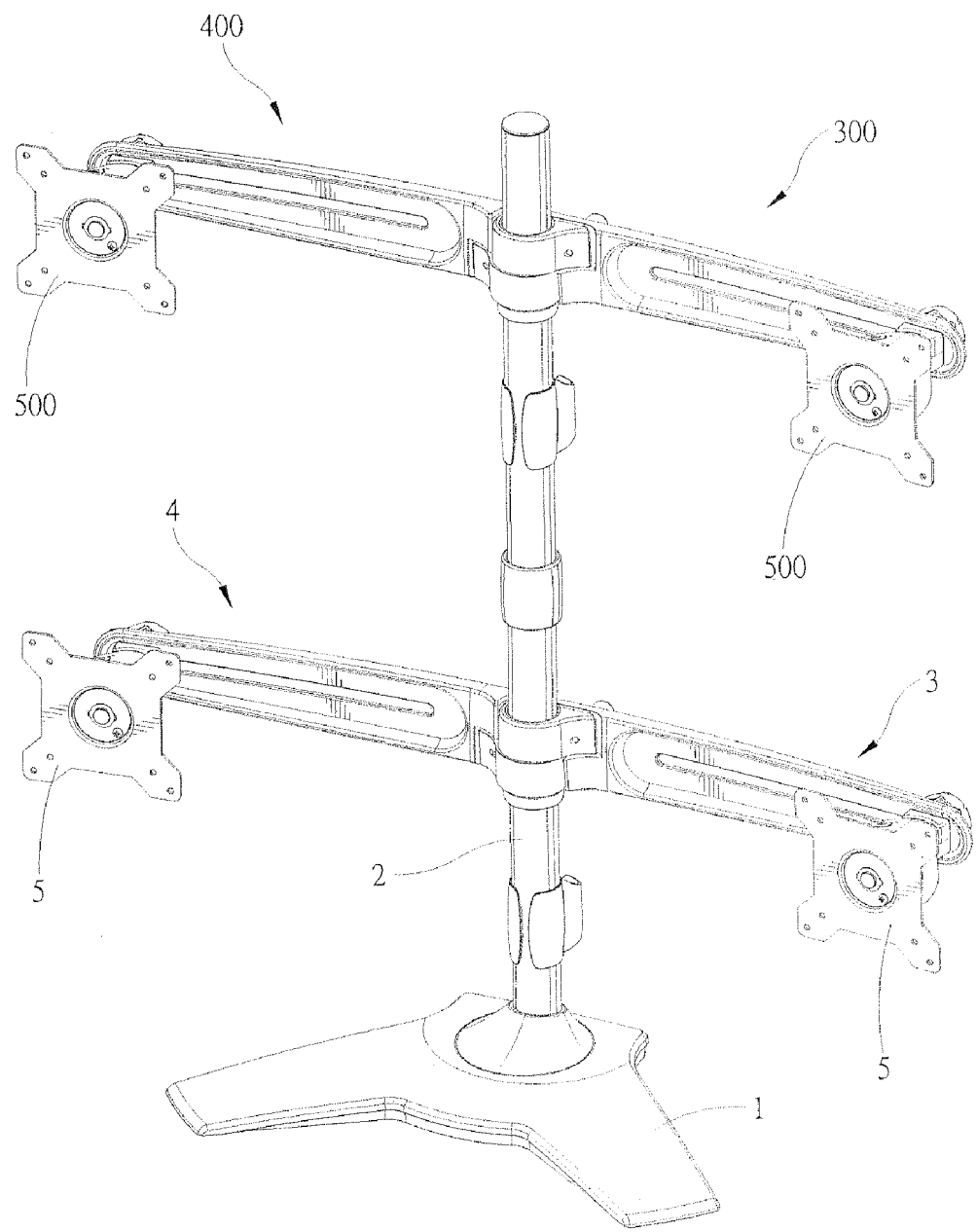
FIG. 8 is an assembled perspective view of a second preferred embodiment of the monitor support device according to the invention.

As shown in FIG. 8, the second preferred embodiment of the monitor support device according to the present invention has a structure similar to that of the first embodiment. The main difference between this embodiment and the previous embodiment resides in the following. In this embodiment, the monitor support device further comprises a third support arm 300 identical in structure to the first support arm 3, and a fourth support arm 400 identical in structure to the second support arm 4. The third support arm 300 is pivotable about and movable along the upright rod 2 above the first and second support arms 3, 4. The fourth support arm 400 is pivotable about the upright rod 2 above the first and second support arms 3, 4 and is movable relative to the third support arm 300. The monitor support device of this embodiment further comprises a pair of monitor engaging components 500 that engage slidably and respectively the third and fourth support arms 300, 400. The second preferred embodiment further enhances the flexibility during use.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A support device adapted for supporting first and second monitors thereon, said support device comprising:
   a base;
   an upright rod extending uprightly from said base;
   a first support arm having
      a first pivot portion that surrounds and is fastened releasably on said upright rod, and that has an upper surface, and a first extending portion that extends horizontally from said first pivot portion, that is adapted for supporting the first monitor thereon, and that has an upper surface, said first support arm being movable along said upright rod when loosened, said upper surface of said first extending portion being higher than said upper surface of said first pivot portion and cooperating with said upper surface of said first pivot portion to define a first vertical surface therebetween, said first vertical surface cooperating with said upper surface of said first pivot portion to define a first space therebetween; and a second support arm having a second pivot portion that surrounds and is fastened releasably on said upright rod, and that has a lower surface, and a second extending portion that extends horizontally from said second pivot portion, that is adapted for supporting the second monitor thereon, and that has a lower surface, said first support arm being movable along said upright rod when loosened, said lower surface of said second extending portion being lower than said lower surface of said second pivot portion and cooperating with said lower surface of said second pivot portion to define a second vertical surface therebetween, said second vertical surface cooperating with said lower surface of said second pivot portion to define a second space therebetween;

wherein, when said first pivot portion of said first support arm abuts against said second pivot portion of said second support arm, said first pivot portion of said first support arm engages said second space of said second support arm, and said second pivot portion of said second support arm engages said first space of said first support arm.

2. The support device as claimed in claim 1, wherein said first vertical surface has a height equal to that of said second pivot portion, and said second vertical surface has a height equal to that of said first pivot portion.

3. The support device as claimed in claim 1, wherein:

said upper surface of said first pivot portion of said first support arm is formed with a first engaging groove and a first engaging block spaced apart from said first engaging groove; and said lower surface of said second pivot portion of said second support arm is formed with:

a second engaging groove corresponding in position to said first engaging block, having a depth corresponding to a height of said first engaging block and an arc length longer than that of said first engaging block, and a second engaging block corresponding in position to said second engaging groove, having a height corresponding to a depth of said first engaging groove and an arc length shorter than that of said first engaging groove.

4. The support device as claimed in claim 1, wherein:

said first pivot portion of said first support arm has a first initial section connected to said first extending portion of said first support arm, a first end section spaced slightly apart from said first initial section, and a first intermediate section interconnecting said first initial section and said first end section and surrounding said upright rod;

said second pivot portion of said second support arm has a second initial section connected to said second extending portion of said second support arm, a second end section spaced slightly apart from said second initial section, and a second intermediate section interconnecting said second initial section of said second end section and surrounding said upright rod;

said support device further comprises first and second locking bolts, said first locking bolt having a head segment that abuts against said first initial section, and a threaded stem segment extending threadedly from said head segment through said first initial section and said first end section, and operable to draw said first end section toward said first initial section so as to constrict said first pivot portion to thereby fasten said first pivot portion on said upright rod, said second locking bolt having a head segment that abuts against said second initial section, and a threaded stem segment extending threadedly from said head segment through said second initial section and said second end section, and operable to draw said second end section toward said second initial section so as to constrict said second pivot portion to thereby fasten said second pivot portion on said upright rod.

5. The support device as claimed in claim 1, wherein:

each of said first extending portion of said first support arm and said second extending portion of said second support arm is formed with an elongated slot that extends horizontally; and said support device further comprises a pair of monitor engaging components adapted to be coupled respectively to the first and second monitors, each of said monitor engaging components engaging slidably said elongated slot of a respective one of said first and second extending portions.

\* \* \* \* \*